Sept. 1, 1925. 1,551,542
F. H. CRAGO
TRAP
Filed March 4, 1924 2 Sheets-Sheet 1

Inventor
F. H. Crago
By C. A. Snow & Co.
Attorneys

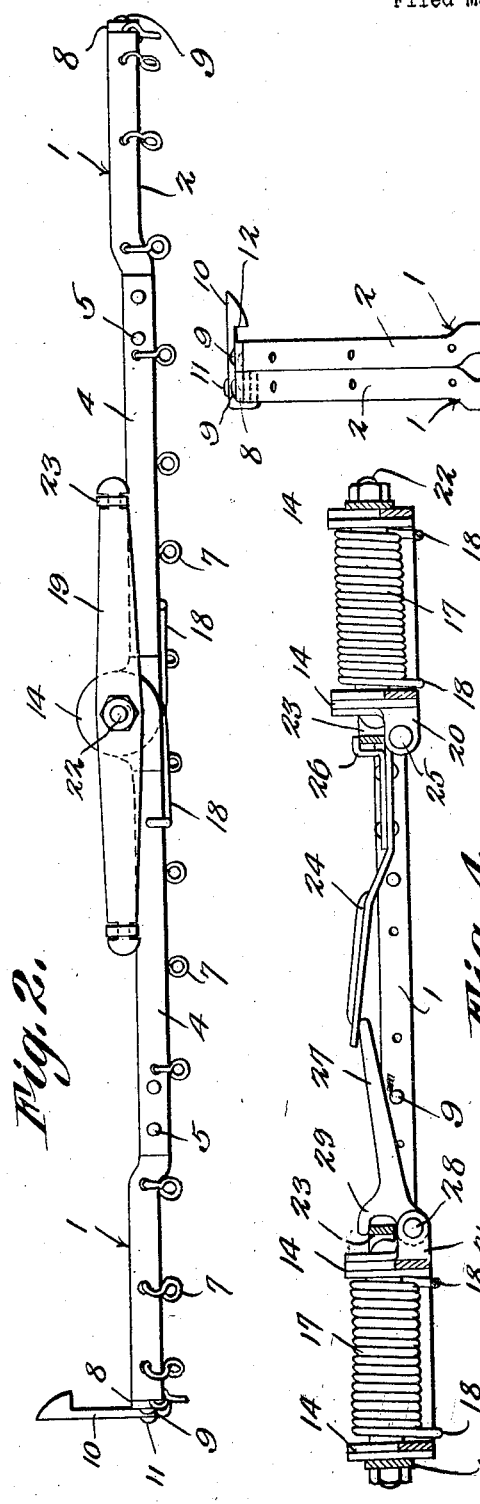
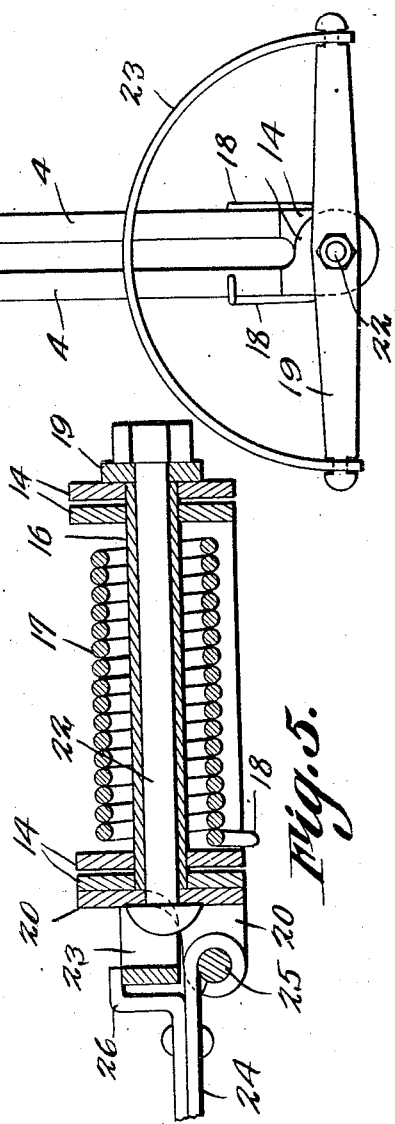
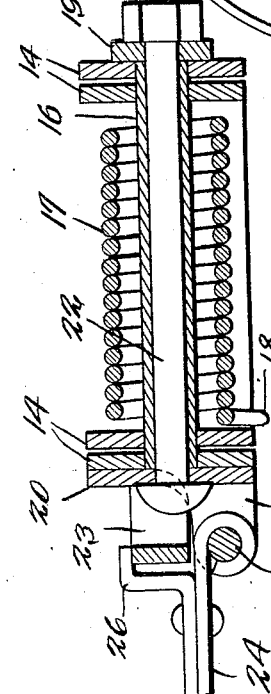

Patented Sept. 1, 1925.

1,551,54[?]

UNITED STATES PATENT OFFICE.

FELIX H. CRAGO, OF MILLTOWN, MONTANA.

TRAP.

Application filed March 4, 1924. Serial No. 698,842.

*To all whom it may concern:*

Be it known that I, FELIX H. CRAGO, a citizen of the United States, residing at Milltown, in the county of Missoula and State of Montana, have invented a new and useful Trap, of which the following is a specification.

This invention aims to provide a simple trap in which animals may be taken alive, novel means being provided for operating and controlling the jaws of the trap.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made, without departing from the spirit of the invention.

In the drawings:—

Figure 2 is an elevation of the structure shown in Figure 1;

Figure 3 is an end elevation wherein the trap is shown closed;

Figure 4 is a transverse section wherein the trap is shown in set position, the pouch being omitted in Figures 2, 3 and 4;

Figure 5 is a sectional view taken through the pivotal mounting for the jaws.

Figure 1:
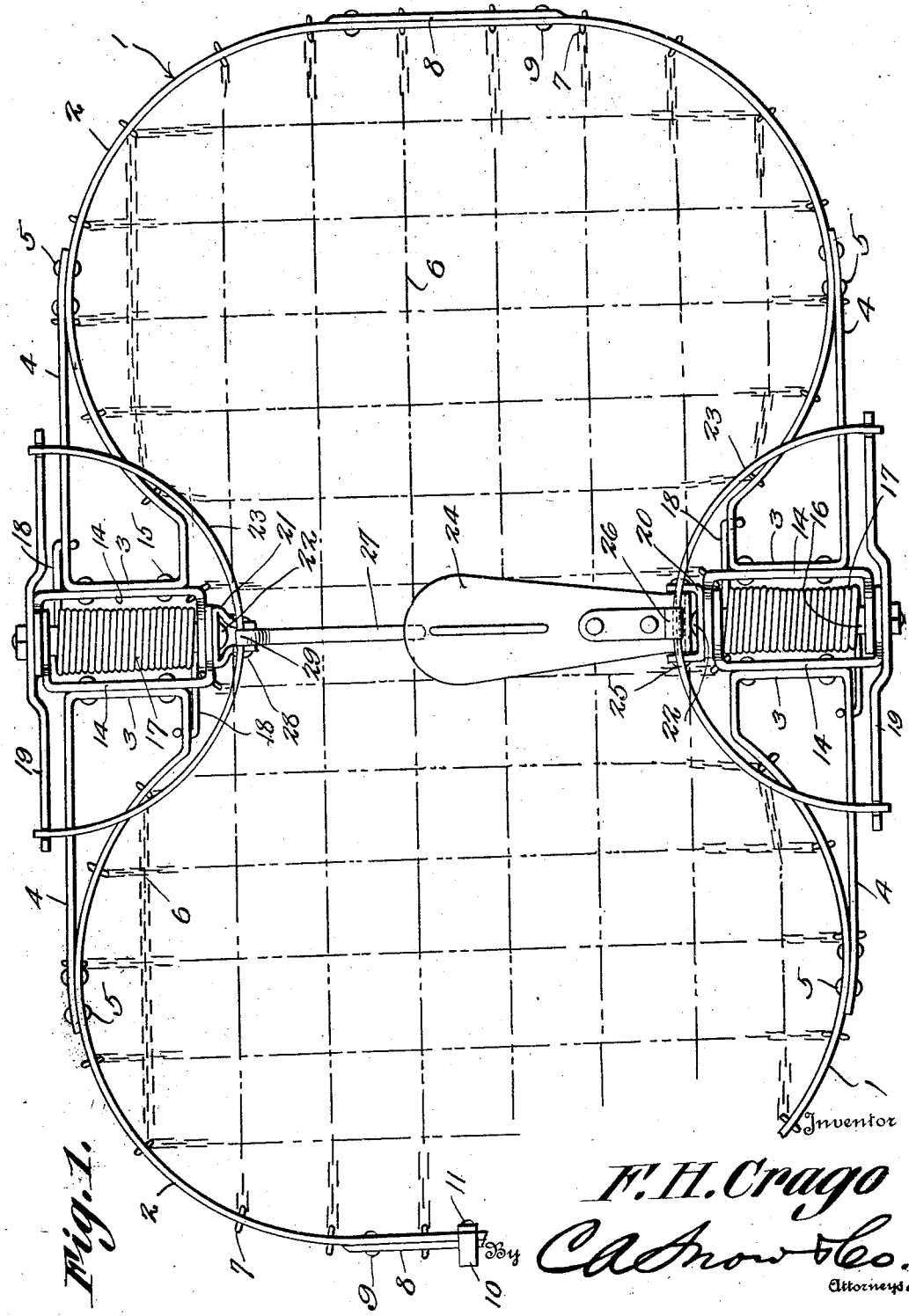
Figure 1 shows in top plan, a trap constructed in accordance with the invention, parts being broken away.

The trap forming the subject matter of this application comprises jaws 1 each including a loop-shaped body 2 having outwardly extended arms 3 terminating in extensions 4 which are secured at 5 to the body 2. Reinforcing strips 8 are secured at 9 to the outer portions of the body 2 of the jaws 1, a spring latch 10 being attached at 11 to the reinforcing strip 8 of one jaw, and being adapted to cooperate with the reinforcing strip of the other jaw, to hold the jaws against accidental opening, when the jaws are closed, as in Figure 3, there being enough play between the latch 10 and one jaw as indicated at 12 in Figure 3, so that the latch will cooperate with the jaws and hold them against accidental opening, even though the jaws do not happen to close tightly together, as shown in Figure 3. U-shaped hinged members 14 are secured at 15 to the arms 3 of the body 2 of the jaws 1. A pouch 6, made of chain netting or other suitable material is connected as at 7 to the bodies 2 of the jaws, to the extensions 4 and to the hinge members 14. The ends of the U-shaped hinge members 14 are overlapped on each other and are mounted on sleeves 16 constituting parts of the pivotal mountings of the jaws. Torsion springs 17 surround the sleeves 16, the ends of the springs being marked by the numeral 18. One end of each spring 17 engages the extension 4 of one jaw 1 and the other end of the spring is engaged with the loop-shaped body 2 of the cooperating jaw, in a way which will be understood clearly when Figure 1 of the drawings is noted. The springs tend to swing the jaws 1 together, from the position shown in Figure 1 to the position depicted in Figure 3.

Supports 19 abut intermediate their ends against the outer ends of the sleeves 16. Against the inner ends of the sleeves 16, brackets 20 and 21 abut. Tightening devices 22, such as posts, extend through the sleeves 16, through the support 19, and through the brackets 20 and 21. By tightening up the nuts on the bolts 22, the supports 19 and the brackets 20 and 21 may be drawn and held against the ends of the sleeves 16 in the same horizontal plane, it being possible for the hinge members 14 of the jaws to swing freely on the sleeve 16, no matter how tightly the nuts on the bolts 22 may be set up. Bail shaped retainers 23 are pivoted on the ends of the supports 19 and are adapted to overhang the bodies of the jaws 1. The retainers 23 bear upon the extensions 4, and, thus, the retainers are given a good leverage during the setting of the trap.

A main trigger, in the form of a plate, and marked by the numeral 24, is located adjacent to the transverse center of the trap, in line with the tightening devices 22, and is pivotally mounted at 25 on the bracket 20, the main trigger having an offset keeper 26 adapted to engage the adjacent retainer 23. An auxiliary trigger 27 in the form of a rod or bar, is pivotally mounted at one end, as shown at 28 on the bracket 21, the inner end of the auxiliary trigger extending beneath and engaging the inner end of the trigger 24, as clearly shown in Figure 4, the auxiliary trigger carrying an offset keeper 29 adapted to engage the adjacent retainer 23. The auxiliary trigger 27, the bracket 21, and the corresponding retainer and support, may be omitted when desired, the parts specified generally being used only on large traps, or when it is desired to hold the jaws 1 open, against the action of the springs 17, by separate instrumentalities located adjacent to each of the said springs.

When the trap is set, as shown in Figure 1, the retainers 23 extend inwardly, and hold the jaws opened, one retainer being engaged with the keeper 29 of the auxiliary trigger 27, and the other retainer being engaged with the keeper 26 of the main trigger 24, the inner end of the auxiliary trigger extending beneath the inner end of the main trigger, as shown in Figure 4. When an animal treads on the main trigger 24, the inner ends of both triggers 24 and 27 will be carried downwardly, the keepers 26 and 29 being disengaged from the retainers 23, the jaws 1 swing together, under the action of the springs 17, and the jaws swinging the retainers 23 outwardly in opposite directions on the supports 19. When the jaws come together, they will be held against accidental opening by the latch 10. The trap is made large enough so that the animal to be caught is not gripped by the jaws 1, the pouch 6 merely being closed about the animal, and the animal being taken alive, an operation which is peculiarly desirable when, as in the case of fur-bearing animals, it is desirable to take the adult males, females and the small animals being set free. The trap is so constructed that it will be sprung at a very light pressure on the trigger plate 24 and the device will be found useful either in catching large animals or small animals.

Having thus described the invention, what I claim is:—

1. A trap comprising jaws each including a loop-shaped body having outwardly extended arms terminating in angularly disposed extensions secured at their ends to the bodies of the jaws, pivot members, means for connecting the arms of the jaws with the pivot members, to permit the jaws to open and close, spring means for closing the jaws, a support mounted intermediate its ends on the outer end of one pivot member, a bail-shaped retainer pivoted to the ends of the support and overhanging the jaws when the jaws are opened, the retainer cooperating with the extensions to increase the leverage of the retainer on the jaws whilst the jaws are being opened, and latch mechanism cooperating with the retainer to hold the jaws open.

2. A trap comprising arcuate jaws, pairs of U-shaped hinge members secured to the jaws the ends of the hinge members of each pair being overlapped, tubular sleeves mounted in the overlapped ends of the hinge members of both pairs, a helical spring disposed about one sleeve and engaged at its ends with both jaws, to close them, tightening devices extended through the sleeves and through the overlapped ends of the hinge members of both pairs, means bound by one of the tightening devices against the ends of one sleeve for holding the hinge members of one pair on said sleeve, a bracket and a support held by the other tightening device against the ends of the corresponding sleeve, a retainer pivoted to the support and overhanging the jaws when the jaws are opened, and a trigger pivoted to the bracket and coacting with the retainer to hold the jaws open.

In testimony that I claim the foregoing as my own, I have hereto affixed my signature.

FELIX H. CRAGO.